US009284979B2

(12) United States Patent  
Hewitt

(10) Patent No.: US 9,284,979 B2  
(45) Date of Patent: Mar. 15, 2016

(54) PERMANENT VISUAL INDICATOR AND DIAMETRICAL TO AXIAL RELATION GAGE AND METHOD OF USING SAME

(71) Applicant: Baldor Electric Company, Fort Smith, AR (US)

(72) Inventor: William Gregory Hewitt, Taylors, SC (US)

(73) Assignee: Baldor Electric Company, Fort Smith, AR (US)

( * ) Notice: Subject to any disclaimer, the term of this patent is extended or adjusted under 35 U.S.C. 154(b) by 32 days.

(21) Appl. No.: 14/487,577

(22) Filed: Sep. 16, 2014

(65) Prior Publication Data

US 2015/0003763 A1    Jan. 1, 2015

Related U.S. Application Data

(62) Division of application No. 13/553,007, filed on Jul. 19, 2012.

(51) Int. Cl.

| F16C 35/07 | (2006.01) |
|---|---|
| F16C 33/04 | (2006.01) |
| F16C 35/073 | (2006.01) |
| F16C 17/10 | (2006.01) |
| F16C 43/02 | (2006.01) |
| F16C 23/08 | (2006.01) |

(52) U.S. Cl.
CPC .............. *F16C 33/04* (2013.01); *F16C 17/10* (2013.01); *F16C 35/073* (2013.01); *F16C 43/02* (2013.01); *F16C 23/086* (2013.01); *Y10T 29/497* (2015.01); *Y10T 29/4978* (2015.01); *Y10T 29/49696* (2015.01); *Y10T 29/49771* (2015.01); *Y10T 403/635* (2015.01); *Y10T 403/7005* (2015.01); *Y10T 403/7007* (2015.01); *Y10T 403/7051* (2015.01); *Y10T 403/7056* (2015.01)

(58) Field of Classification Search
CPC .......... F16C 33/04; F16C 17/10; F16C 43/02; F16C 35/073; F16C 23/086; Y10T 403/635; Y10T 29/497; Y10T 29/4978; Y10T 403/7007; Y10T 403/7005; Y10T 29/49771; Y10T 403/7056; Y10T 403/7051; Y10T 29/49696; B25G 3/18; E03D 11/16; F16D 1/033; F16J 15/3404

See application file for complete search history.

(56) References Cited

U.S. PATENT DOCUMENTS

| 5,709,483 A * | 1/1998 | Martinie ............... F16C 35/073 384/538 |
|---|---|---|
| 5,779,419 A * | 7/1998 | Kellstrom ............... F16C 25/06 411/14 |
| 6,685,191 B2 | 2/2004 | Toal |
| 7,665,373 B2 | 2/2010 | Sakers et al. |
| 7,788,786 B2 | 9/2010 | Hewitt et al. |

(Continued)

*Primary Examiner* — David Bryant  
*Assistant Examiner* — Jun Yoo  
(74) *Attorney, Agent, or Firm* — Thompson Coburn LLP

(57) ABSTRACT

A system and method for mounting a bearing assembly on a shaft includes an internal flange, external flange, and a sleeve. The internal flange is securable to the bearing assembly and has a displacement pin extending outward that defines an initial position of the bearing assembly relative to the shaft. The external flange is secured to the internal flange via fasteners passing through elongated holes. The external flange has an opening configured to receive the displacement pin. The external flange may be rotated when coupled to the internal flange with the fasteners between a first position where the external flange opening is not in register with the displacement pin and a second position where the external flange opening is in register with the displacement pin. A sleeve has a tapered outside diameter and is engageable with the external flange.

19 Claims, 7 Drawing Sheets

(56) References Cited

U.S. PATENT DOCUMENTS 7,909,516 B2 3/2011 Hewitt et al.
2005/0277480 A1 12/2005 Breese
2007/0243013 A1 10/2007 Hewitt
2012/0079648 A1 4/2012 Coronado et al.

* cited by examiner

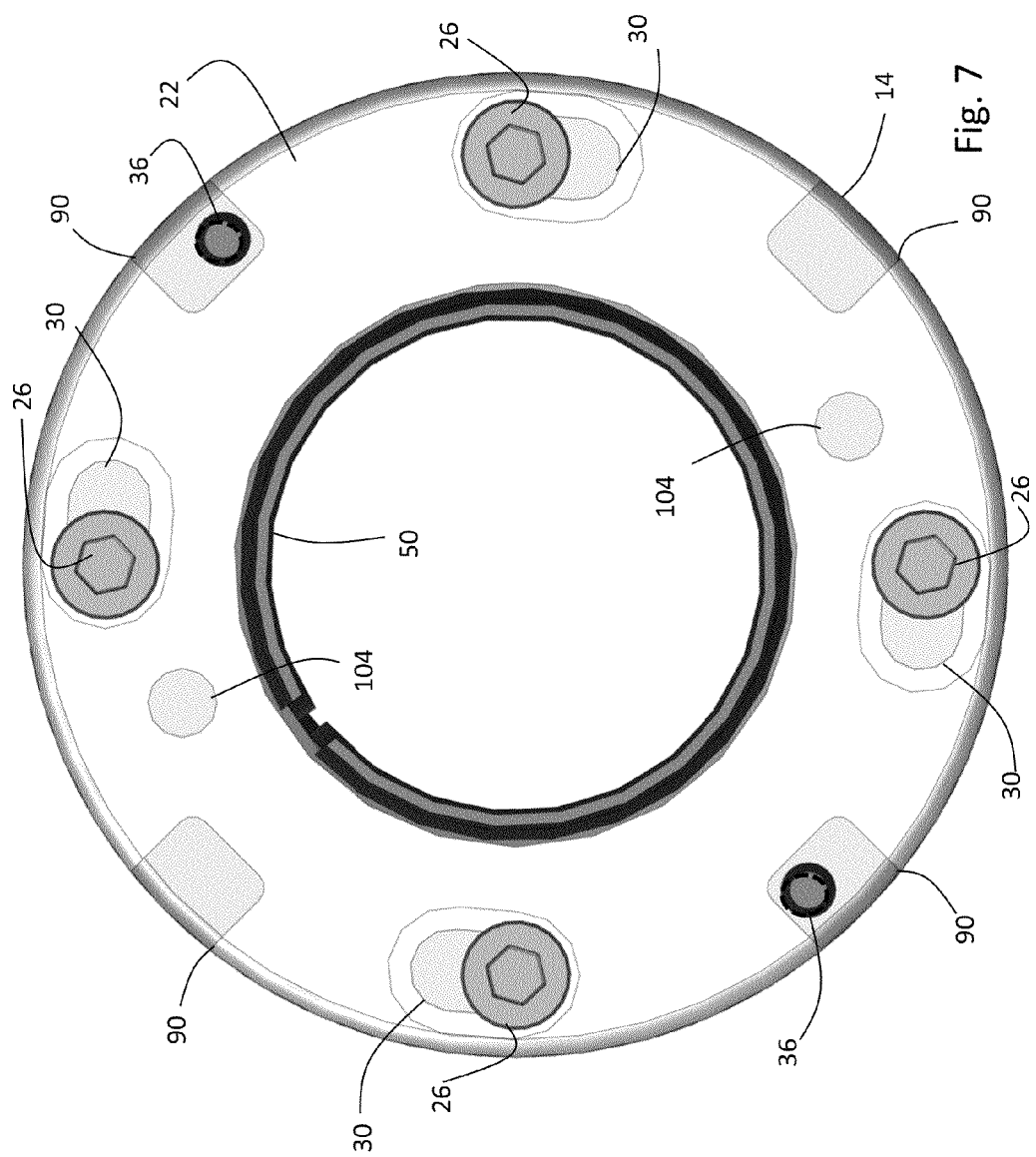

PERMANENT VISUAL INDICATOR AND DIAMETRICAL TO AXIAL RELATION GAGE AND METHOD OF USING SAME

RELATED APPLICATION DATA

This application is a divisional of application Ser. No. 13/553,007, filed Jul. 19, 2012, currently pending.

BACKGROUND

The present invention relates to the field of mechanically mounting an element to a shaft. More specifically, the invention relates to an innovative tapered sleeve system used to mount a bearing assembly or other mechanical element to a shaft.

Rotary mechanical systems include elements, such as bearings, that allow relative rotational movement between respective parts. For example, a rotary system might include a stationary housing that supports a rotating shaft via a bearing assembly. The bearing assembly is typically mounted directly to the shaft and allows for the relative rotational movement between the stationary housing and the rotating shaft.

A variety of mounting systems are known and commercially available for mounting a bearing assembly or other mechanical element to a shaft. Some of these systems make use of a tapered sleeve that fits snuggly between the outer periphery of the shaft and the inner ring of the bearing assembly. The tapered outside diameter of the sleeve engages the tapered inside diameter of the bearing assembly and causes the sleeve to enter into an interference fit with both the inner ring and the shaft. Variations of this type of arrangement may include multiple sleeves that alleviate the need for a taper either on the shaft or the bearing ring, as well as various mechanical arrangements for pressing or drawing the sleeve into tight engagement.

Those skilled in the art are familiar with the operation of this type of system and the limitations of using such systems. The first limitation relates to part tolerance and the initial clearance between these parts (i.e. the shaft outside diameter, the sleeve width, the inside diameter of the bearing assembly, etc). These are inherent in every mechanical system because each component is manufactured within some tolerance range and each assembly has some initial clearances to allow the user to assemble and initially position the parts. The user can eliminate this variable by assembling the parts to an initial position or "zero reference point" that represents the position where all of these tolerances and initial clearances between the parts have been removed. This initial position can be problematical in that, if not accurately established, it can lead to further assembly problems as discussed below.

Besides the tolerance and initial clearance between all of the mating parts, bearing assemblies themselves have an initial internal clearance between the internal components of the bearing. Too much, and particularly too little internal clearance, such as resulting from overloading the internal ring, can result in damage to the bearing and eventual mechanical system failure.

Another limitation of tapered sleeve mounting systems relates to the manner in which the tapered sleeve is driven or drawn into engagement between the bearing assembly and the shaft. Often in these type systems, a drive thread is used to urge the tapered sleeve into place. This drive thread is often incorporated into the outside diameter of the sleeve itself, thus requiring the thread to be no less than the shaft diameter. Because these systems can be used on very large shaft diameters (e.g., 10 inches and larger), the threads themselves must also be relatively large. Consequently, special tooling is often required to torque the larger components that engage the oversized threads. Also, large diameter threads have larger contacting areas and thus frictional losses are increased. These forces, when combined with the frictional forces of the tapered system itself result in very large moments that must be imparted on the components to thread the sleeve properly into engagement. Also, the frictional force in the thread can vary greatly resulting in a great deal of uncertainty in the torque required to engage this thread. This is problematic because this torque value is often used to determine the initial position and/or fully engaged position. If this torque is not consistent, the user may incorrectly believe they have reached the initial position when they have not, or they may believe they have not reached the initial position when they have. Both of these undesirable results can lead to damage to the bearing and/or mechanical system failure.

There is a need in the art for techniques for securing rotating components, particularly bearings and shafts that alleviate or address at least some of these drawbacks of existing technology. There is a particular need for an approach in the assembly of sleeve systems that allows for accurate judgment of initial and final engagement of a sleeve between a bearing and a shaft, or between any two concentrically mating elements.

BRIEF DESCRIPTION OF THE DRAWINGS

FIG. 7 is an end view of the mounting system of FIG. 1 showing the mounting system in a final loaded position with the external flange abutting the internal flange.

DETAILED DESCRIPTION

The disclosure that follows provides an approach that addresses some or all of the issues and problems discussed above. In one implementation, the system or kit may generally include an internal flange, a bearing assembly (or other shaft mounted element), an external flange, a tapered sleeve, and a plurality of fasteners. The system mounts a bearing assembly (or other shaft mounted element) to a shaft by drawing the tapered sleeve into the assembly between shaft, and the bearing assembly (or other shaft mounted element). In one embodiment, the system is preassembled and preset with the internal flange mounted to the bearing assembly, and the external flange mounted to the internal flange with a plurality of fasteners and threadably connected with the sleeve. Displacement pins hold the external flange in a spaced arrangement with the internal flange. The system may be slid into position on shaft. The external flange and internal flange may be rotated as a unit relative to the sleeve, preferably by hand, to draw the sleeve into the assembly where the sleeve is secured between the shaft and the inner diameter surface of the inner race. This initial position or zero reference point ("ZRP") is the point where tolerances and initial clearances between the mating parts have been removed.

Once the initial or zero reference position is determined, the plurality of fasteners may be used to set the assembly at the final position. The displacement pin(s) extending outward from the internal flange between the internal and external flanges sets the proper distance between the initial position and the final position of the sleeve relative to the bearing assembly or other shaft mounted element. The length of the displacement pin may equal to the amount of axial sleeve movement relative to the shaft and bearing that is required for proper mounting. The external flange has an opening, which may be a notch, so that as the external flange is rotated relative to the internal flange, the displacement pin may be aligned with the opening in the external flange, thereby allowing the flanges to be drawn in abutting contact. The fasteners may remain in place during system operation, ensuring that the sleeve does not disengage the bearing.

This loading system reduces the frictional loses in the drive mechanism and does not require the user to overcome an excessive amount of drive thread resistance. This also has the very important benefit of allowing the user to accurately determine and reliable quantify an initial position of the sleeve as it is driven into engagement. A further description follows below.

Figure 1:
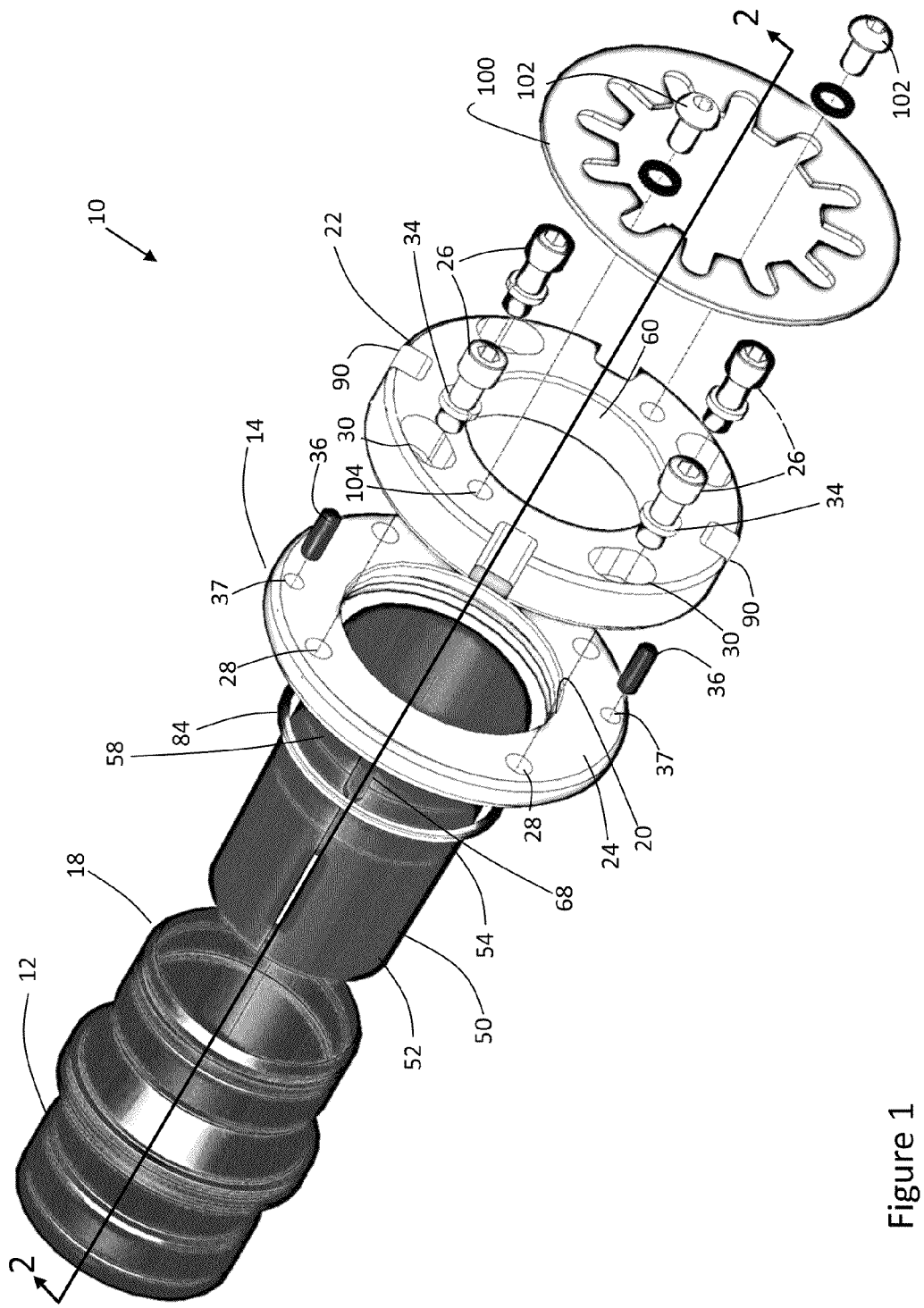
FIG. 1 is an exploded perspective view of the mounting system illustrating a bearing assembly, internal flange, external flange, tapered sleeve, and fasteners in a presently contemplated embodiment of the invention.
Figure 2:
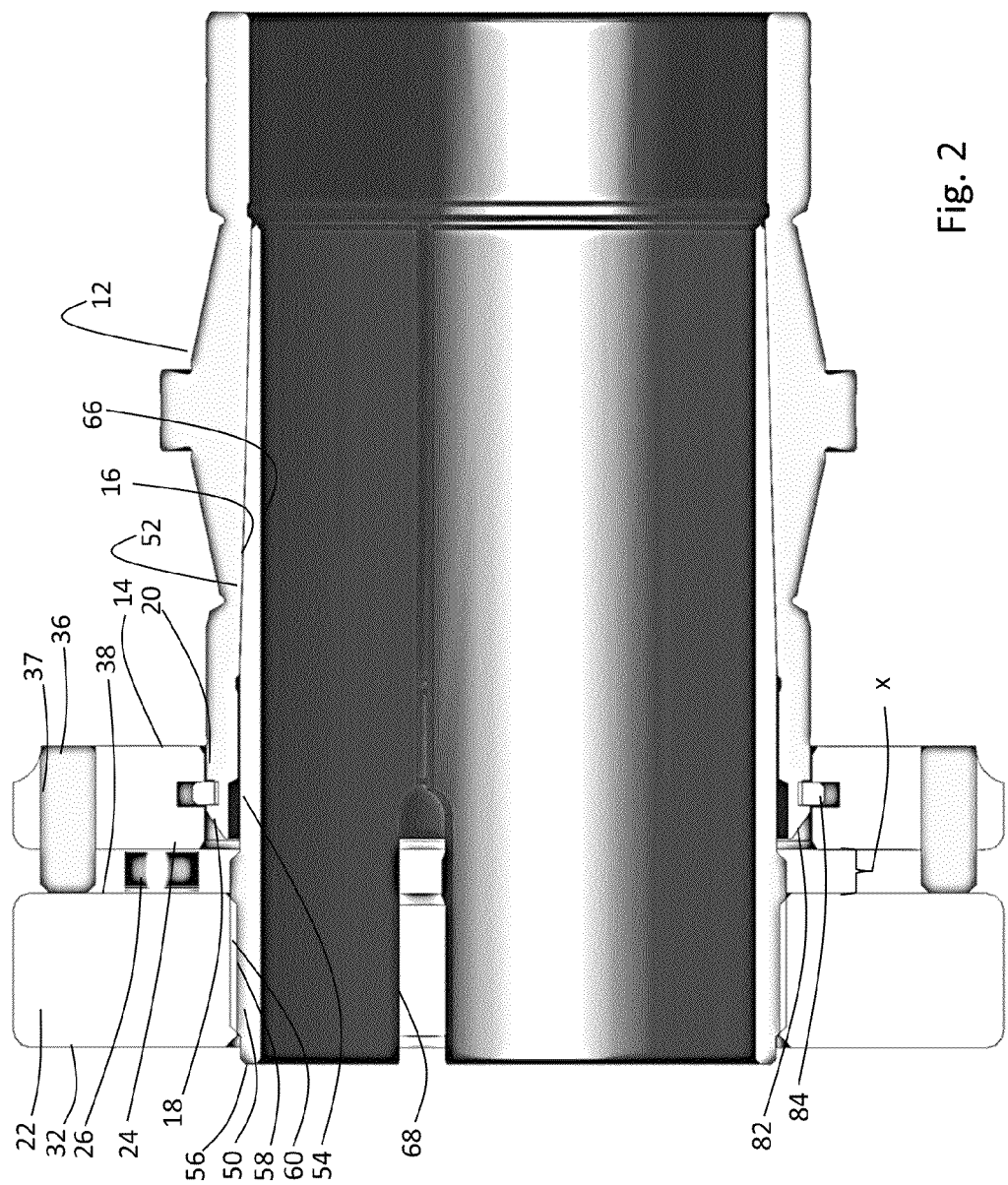
FIG. 2 is a cross-sectional view of the mounting system showing a displacement pin comprising a straight pin used to place the external flange at a zero reference position relative to the internal flange.
Figure 3:
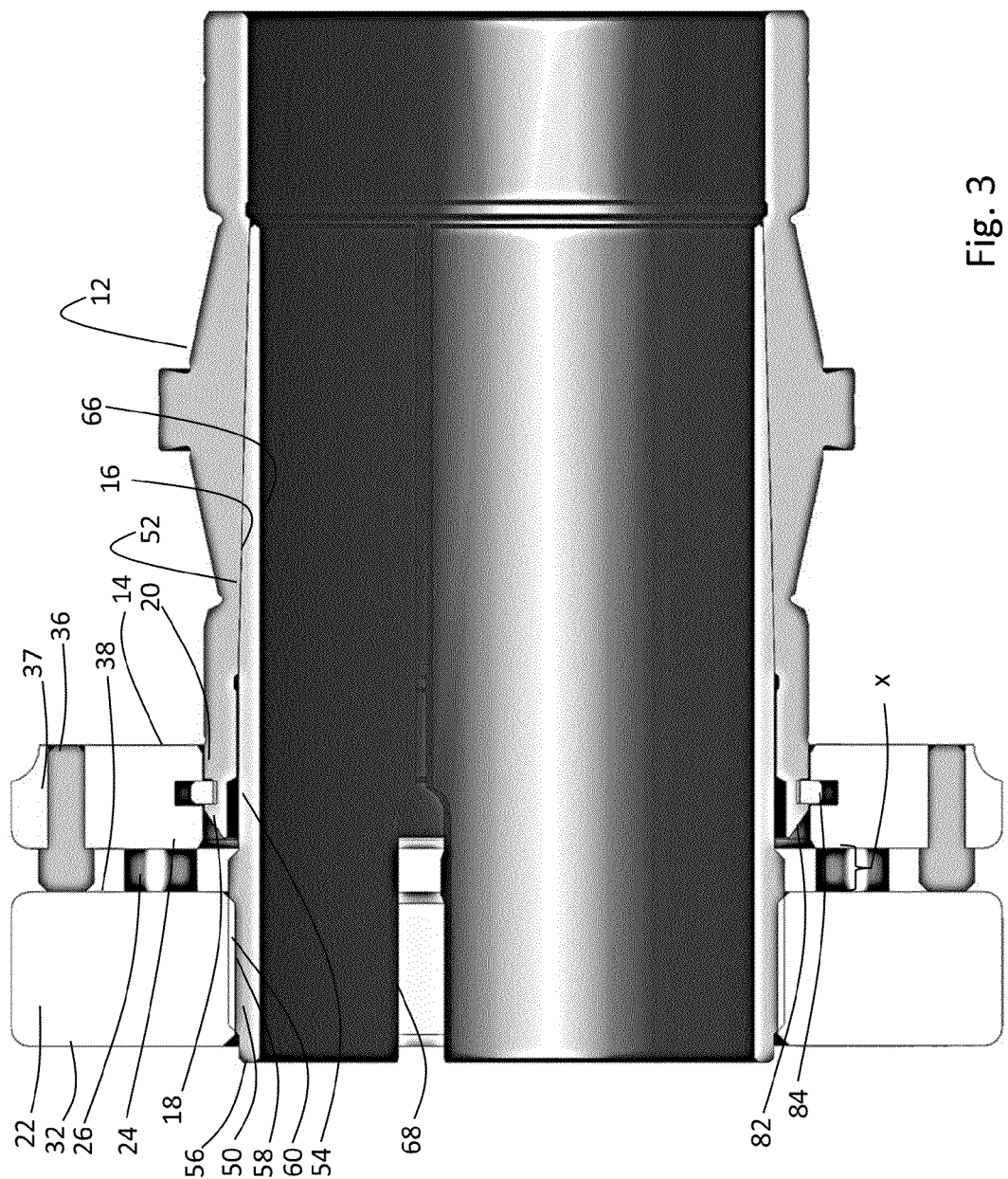
FIG. 3 is an alternate cross-sectional view of the mounting system of FIG. 1 showing a shoulder pin used to place the external flange at a zero reference position relative to the internal flange.
Figure 4:
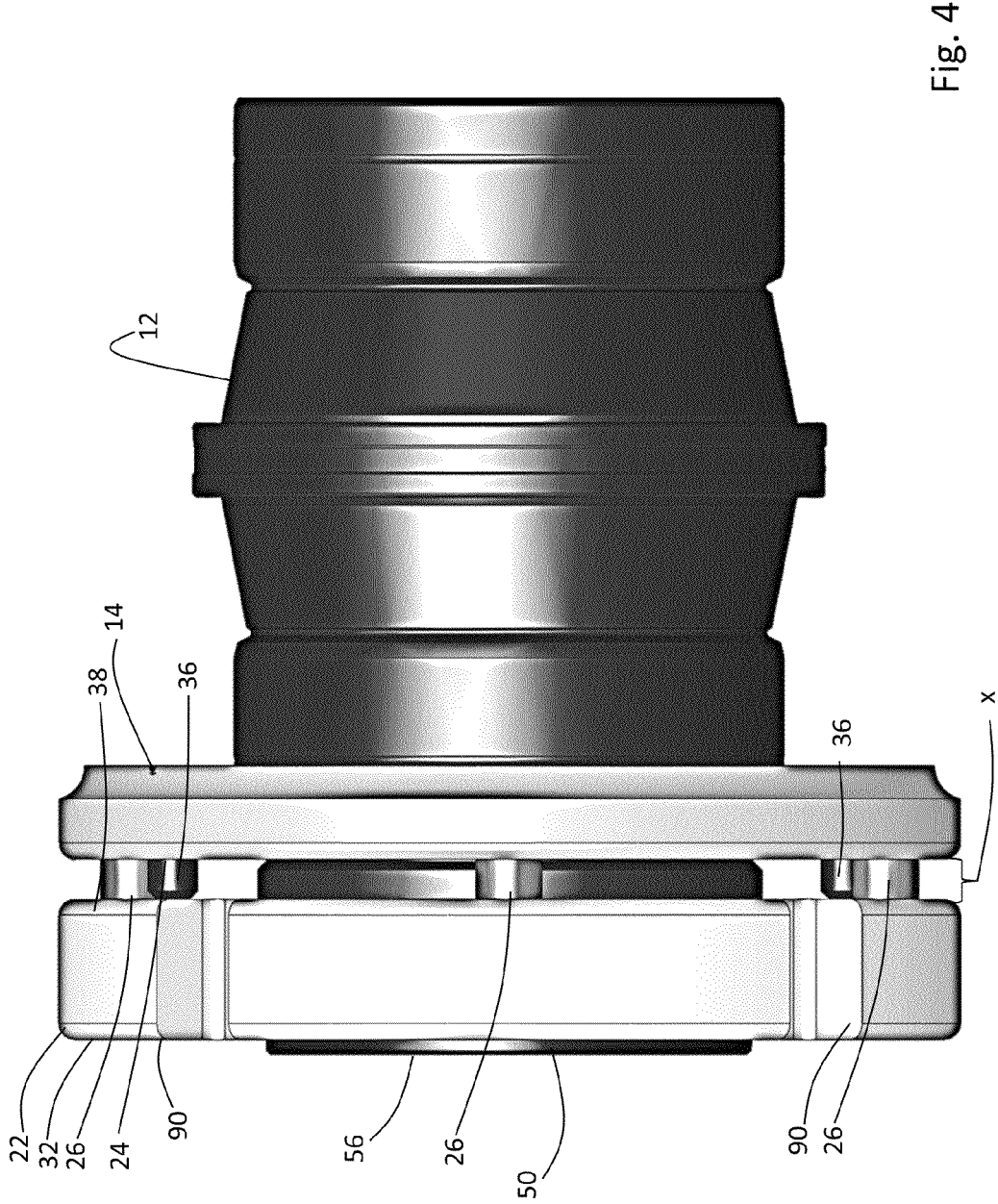
FIG. 4 shows the mounting system of FIG. 1 at the zero reference position.
Figure 5:
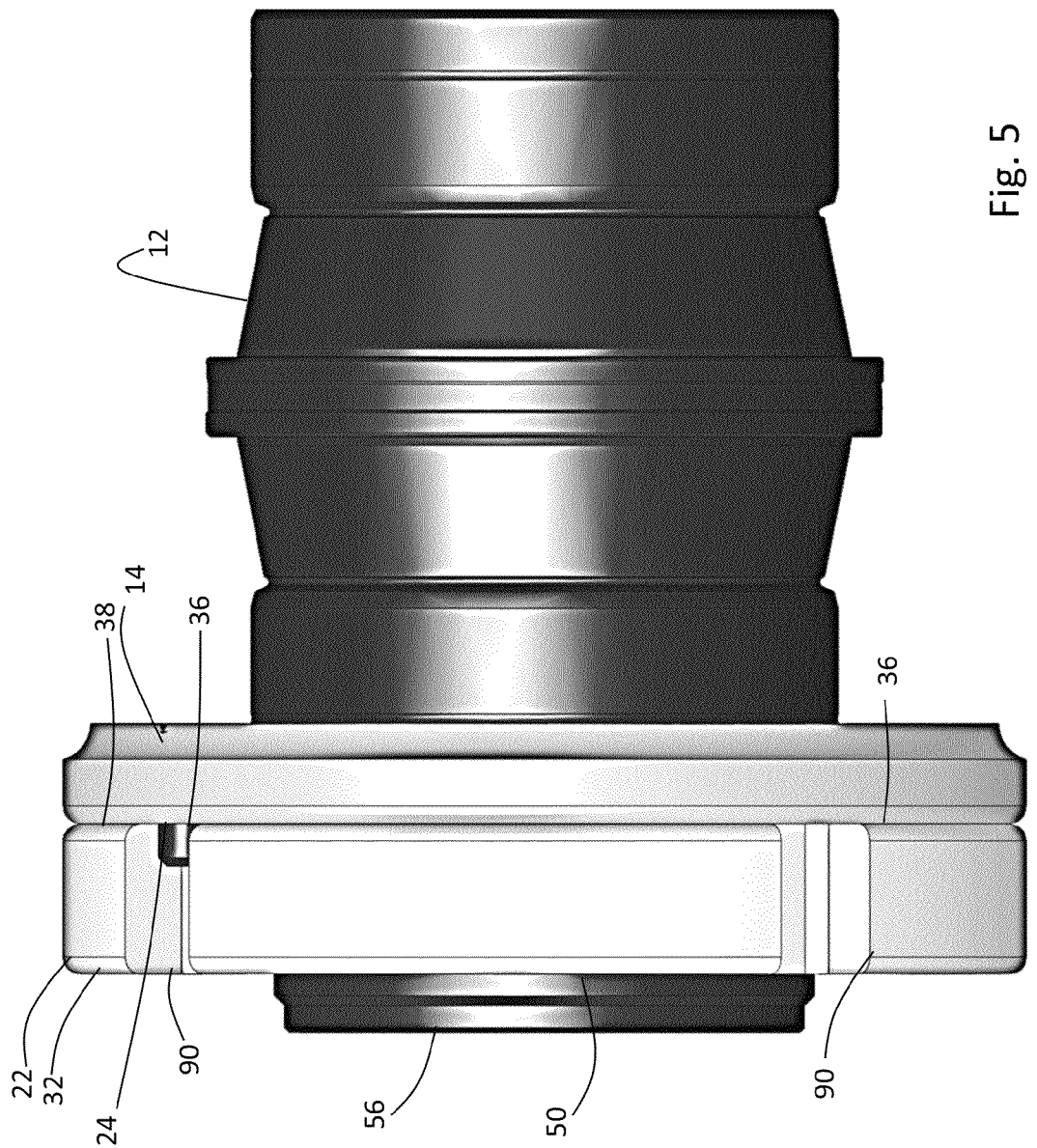
FIG. 5 shows the mounting system of FIG. 1 at the final loaded position.
Figure 6:
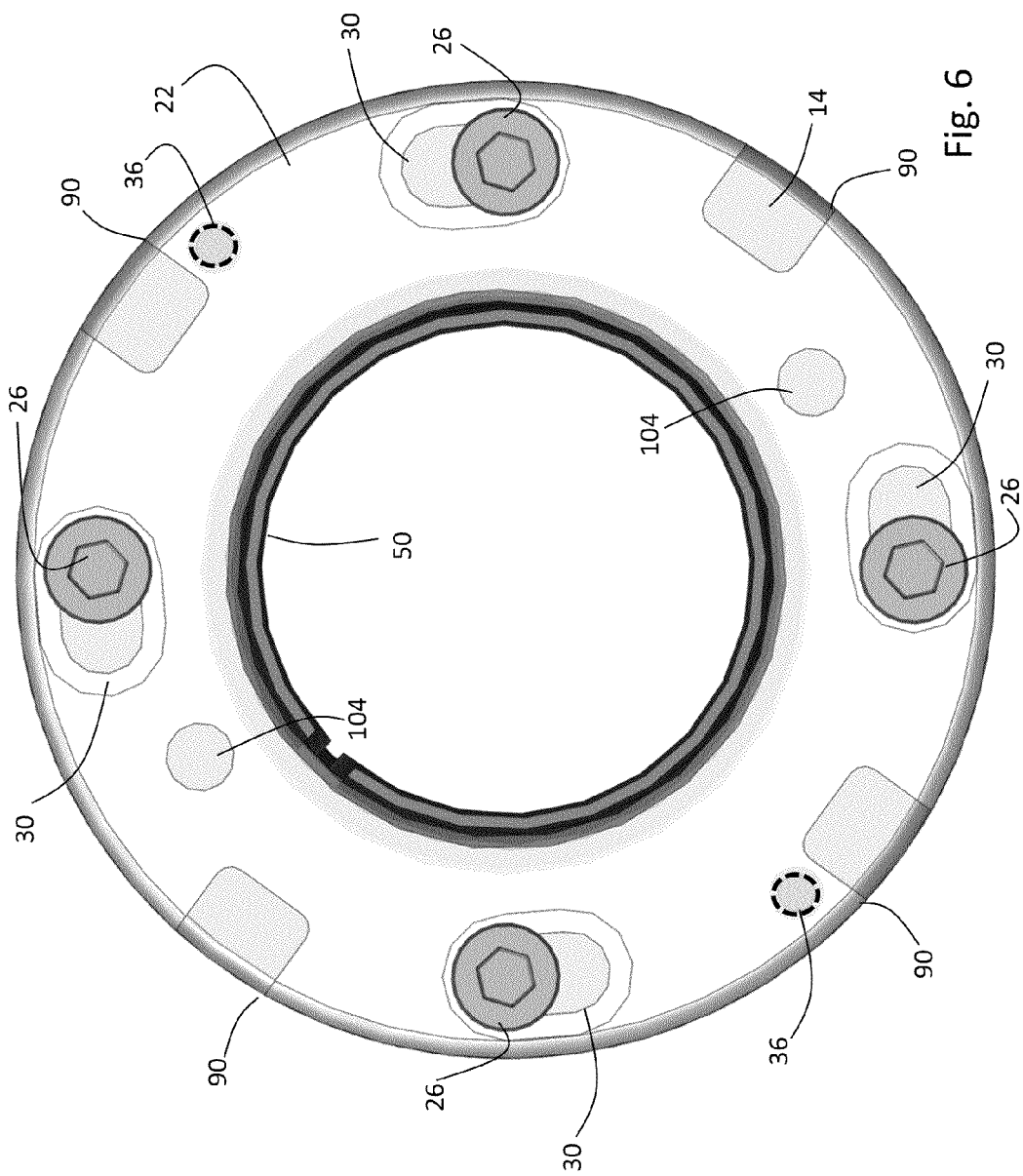
FIG. 6 is a front view of the mounting system looking at the external flange where the external flange is at the zero reference position relative to the internal flange. Thus, the view of FIG. 6 is a side view of the view of FIG. 4.

Turning now to the drawings, FIG. 1 illustrates the elements of an exemplary tapered sleeve mounting system or kit. FIGS. 2 and 3 are sectional views of the mounting system of FIG. 1, sectioned along line 2-2 of FIG. 1. In the exemplary embodiment, the bearing system or a kit 10 comprises a tapered bore bearing 12 mounted to an internal flange 14. While a tapered bore spherical roller bearing is illustrated in the figure, the description is not limited to these specific types of bearings or even bearings products in general and only the inner ring of the bearing is shown for ease of illustration. The bearing assembly 12 may have a tapered inside diameter 16 and a guide 18 to radially locate and mate with an internal diameter 20 of the internal flange 14. The system or kit 10 may also comprise an external flange 22 that may be secured to a front face 24 of the internal flange 14 via a plurality of fasteners 26 engaging threaded holes 28 located on the front face of the internal flange. Elongated holes 30 in the external flange 22 allow the fasteners 26 to pass through the external flange and load a front face 32 of the external flange thereby allowing the flanges to be coupled together. A washer 34 may be used in conjunction with the fasteners to distribute the load on the front face 32 of the external flange 22.

A displacement pin 36 may be mounted in a displacement pin hole 37 in the internal flange 14. The displacement pin 36 may project out of the displacement pin hole and extend from the front face 24 of the internal flange 14 and to the back face 38 of the external flange 22, as explained below in greater detail. The displacement pins 36 may be machined such that they have a press fit into corresponding holes found on the internal flange 14. As shown in FIG. 2, the displacement pins 36 may have a constant cylindrical surface and may be press fit into the internal flange at a depth which leaves the pin protruding at the correct height to produce the required axial displacement and required diametrical clearance reduction. As shown in FIG. 3, the displacement pins 36 may be machined with a shoulder such that the height of the larger diameter portion of the pin is a length which equates to the axial displacement required to provide the desired diametrical clearance reduction within the mounting system and bearing assembly. In accordance with the disclosure, the displacement pins 36 provide a visual indicator that the bearing component has been properly mounted. Accordingly, the bearing manufacturer may set the required axial displacement "x" by precisely setting the distance at which the displacement pins 36 project from the internal flange 14, and securing the external flange 22 with the internal flange at that distance (i.e., the pin dimension) with the fasteners 26.

The kit or system may further comprise a sleeve 50 with a tapered outside diameter 52 that engages the tapered inside diameter 16 of the bearing assembly 12. The outer portion of the sleeve may transition from the tapered outside diameter to a uniform outside diameter 54 near the front face 56 of the sleeve. The sleeve 50 may also have threads 58 adjacent to the uniform diameter portion 54 that threadably engage drive threads 60 on an inner diameter of the external flange 22. With the fasteners 26 mounting the external flange to the internal flange 14, the external flange and internal flange may be rotated as a unit relative to the sleeve 50 so that the external flange threads 60 and sleeve threads 58 cooperate to drive the sleeve into the bearing assembly thereby initially securing the bearing assembly to the shaft at the initial position. The tapered sleeve may have a uniform inside diameter 66 and an axial split 68 allowing it to clamp down on a circular shaft when the tapered diameters are driven together. It should be noted that the present system may be employed with components that are differently configured, particularly insomuch as the engaging tapers are concerned. For example, to avoid tapering the bearing ring itself, another sleeve may be interposed in the assembly that has a surface interfacing with the inner diameter of the inner bearing ring, and a tapered inner surface that contacts the tapered outside diameter of sleeve.

The internal flange 14 may also be axially secured to the inner ring via a snap ring 84. The snap ring may be compressed by an annular camming surface 82 allowing the internal flange 14 to slide onto the inner ring of the bearing assembly 12 up to the point where the snap ring springs into the snap ring groove.

The external flange 22 may be provided with clearance notches 90 that may have an angular displacement therebetween which matches the angular displacement of the displacement pin(s) 36 mounted in the internal flange 14. To allow freedom of rotation, the notches 90 may be greater in dimension than the diameter of the displacement pins. Likewise, the elongated holes 30 may be elongated and arcuate in shape to allow the external flange 22 to be rotated relative to the internal flange 14 to allow the displacement pins 36 to brought into register with and then received in the clearance notches 90 when the internal flange is driven toward the external flange when the bearing system is placed in a final loading position. In addition to, or in the alternative, clearance holes or openings may be provided on the back face of the external flange to receive the displacement pins. The notches 90 on the external flange may also correspond to spanner wrench notches or be configured to accept another tool to cause rotation of the external flange.

The mounting system may be positioned on the shaft, and the external flange 22 and internal flange 14 unit may be engaged with the sleeve 50 to bring the assembly to the initial or zero reference position. When at the initial or zero reference position, the fasteners 26 may be loosened slightly to allow rotation of the external flange 22 relative to the internal flange 14 but to not allow significant axial movement of the external flange relative to the internal flange. The external flange 14 may be rotated until the displacement pins 36 are aligned with the clearance notches 90 of the external flange. This provides a visual indicator that the system is ready to be moved to a final loading position. Thereafter, the fasteners 26 may be tightened to draw the internal flange to the external flange to remove the gap previously created by the displacement pins. The notches may receive the displacement pins as the flanges are brought into abutting contact. Relative axial movement in the amount of the distance "x" causes the inner sleeve 50 to be driven against the inner ring of the bearing 12 to expand reducing the diametrical clearance to the desired amount. In other words, the bearing assembly 12 is drawn over the sleeve 50 from the initial position (where the external flange back face 38 is spaced from the internal flange front face 24 by the amount the displacement pin 36 projects outward from the internal flange front face) to the final position where the external flange back face abuts the internal flange. The distance the displacement pins extend from the front face of the internal flange is equal to the axial displacement required to drive the sleeve from the initial position to the proper final position where the sleeve is fully engaged between the bearing and the shaft. Thus, the exact amount of radially expansion required to reduce the internal clearance of the bearing, or the tight engagement of the sleeve between the bearing and shaft is automatically and precisely set by simply mating the two flanges. Accordingly, the pins and clearance notches provide a permanent visual indicator and diametrical to axial relation gage for the bearing without the need for special or external equipment.

The fasteners 26 may remain in place during operation and help to ensure the sleeve does not disengage the bearing assembly by keeping a constant load on the front load surface. The screws also serve to key the parts together by rotatably locking the internal flange 14, external flange 26, tapered sleeve 50, and bearing assembly 12. This prevents any relative motion between these parts that could otherwise generate frictional heat and lead to eventual failure or unscheduled maintenance of the system.

A cover 100 may be provided outboard of the external flange 22 and secured to the external flange with mechanical fasteners 102 directed through fastener holes 104 on the outer face of the external flange.

Finally, as mentioned throughout the present discussion, the present mounting system is not limited to bearing assemblies and may be used to mount other mechanical elements to a shaft. For example, the system may serve to mount mechanical couplings used to couple one shaft to another. To complete this coupling a mechanical element (typically a coupling "half") is directly mounted to the shaft. The present system may be used to mount this type of element, and many others, directly to a shaft offering all of the same benefits and advantages described above.

While specific embodiments have been described in detail and in the foregoing detailed description and illustrated in the accompanied drawings, those with ordinary skill in the art will appreciate that various modifications and alternatives to those details could be developed in light of the overall teachings of the disclosure. Accordingly, the specific embodiments disclosed and particular ranges disclosed were meant to be illustrative only and not limited as to the scope of the invention, which is to be given the full breath of the appended claims and any and all equivalents thereof.

What is claimed is:

1. A system for mounting a bearing assembly on a shaft, comprising:
    an internal flange axially secured to the bearing assembly, the internal flange having a displacement pin extending outward by a pin dimension;
    an external flange coupled to the internal flange via a plurality of fasteners, the plurality of fasteners passing through holes formed in the external flange, the external flange having an opening configured to receive the displacement pin, the holes being sufficiently dimensioned relative to the fasteners to allow the external flange to be rotated when coupled to the internal flange with the fasteners between a first position where the external flange opening is not in register with the displacement pin and a second position where the external flange opening is in register with the displacement pin; and
    a sleeve having a tapered outside diameter, the sleeve being adapted to be coupled with the external flange, the sleeve configured to be disposed between the bearing assembly and the shaft.

2. The system of claim 1, wherein the pin dimension defines a distance between an initial position of the sleeve relative to the bearing assembly and the shaft and a final position of the sleeve relative to the bearing assembly and the shaft.

3. The system of claim 2, wherein the distance between the initial position and the final position is equal to the amount of relative axial sleeve movement required to properly mount the bearing assembly to the shaft.

4. The system of claim 3, wherein the external flange abuts the internal flange when the system is moved to the final position with the displacement pin received in the external flange opening.

5. The system of claim 2, wherein the plurality of fasteners draws the internal flange toward the external flange as the system moves from the initial position to the final position.

6. The system of claim 1, wherein the displacement pin is one of a plurality of displacement pins extending from the internal flange at the pin dimension.

7. The system of claim 6, wherein the external flange opening is one of a plurality of openings of the external flange configured to receive a corresponding displacement pin.

8. The system of claim 1, wherein the external flange is threadeably connected with the sleeve.

9. The system of claim 1, wherein the opening comprises a notch extending through an outer periphery of the external flange.

10. The system of claim 9, wherein the notch is configured to accept a tool to rotate the external flange.

11. A system for mounting an element to a shaft, the element having a tapered inside diameter, the system comprising:
    an internal flange axially secured to the element, the internal flange having at least one displacement pin extending outward by a pin dimension;
    an external flange coupled the internal flange via at least one fastener, the at least one fastener passing through at least one elongated hole formed in the external flange, the external flange having at least one opening configured to receive the at least one displacement pin, the external flange being rotatable when coupled to the internal flange with the at least one fastener through the at least one external flange elongated hole between a first position where the at least one external flange opening is not aligned with the at least one displacement pin and a second position where the at least one external flange opening is aligned with the at least one displacement pin; and
    a sleeve having a tapered outside diameter, the sleeve being adapted to be coupled with the external flange, the sleeve configured to be disposed between the element and the shaft.

12. The system of claim 11, wherein the pin dimension defines a distance between an initial position of the sleeve relative to the element and the shaft and a desired position of the sleeve relative to the element and the shaft.

13. The system of claim 12, wherein the distance between the desired position and the final position is equal to the amount of relative axial sleeve movement required to properly mount the element to the shaft.

14. The system of claim 13, wherein the external flange abuts the internal flange when the system is moved to the desired position with the displacement pin received in the at least one external flange opening.

15. The system of claim 12, wherein the at least one fastener draws the internal flange toward the external flange as the system is moved from the initial position to the desired position.

16. The system of claim 11, wherein the sleeve is axially split allowing it to clamp the shaft when the tapered outside diameter is engaged.

17. The system of claim 11, wherein the at least one opening comprises a notch extending through an outer periphery of the external flange.

18. The system of claim 17, wherein the notch is configured to accept a tool to rotate the external flange.

19. The system of claim 11, wherein the external flange is threadeably connected with the sleeve.

* * * * *